United States Patent Office 3,279,992
Patented Oct. 18, 1966

3,279,992
FLUORIDATION
Riyad R. Irani, Florissant, Mo., assignor to Monsanto Company, a corporation of Delaware
No Drawing. Filed May 18, 1962, Ser. No. 195,951
15 Claims. (Cl. 167—72)

This invention relates to compositions and process useful for manufacturing special edible compositions which are useful in reducing the frequency of human and animal tooth caries. More particularly, the present invention relates to improved fluoridated table salt (sodium chloride) compositions and the like, and to novel compositions and processes for their manufacture.

The advantages that result from the utilization of fluorides, and especially water-soluble fluorides in dentifrice cleansing and polishing compositions are well known. However, due to habit, social mores, and/or lack of experience, education, or appropriate facilities, a large segment of the world's population either cannot or will not presently avail itself of toothpastes and toothpowders as effective means for beneficial oral hygiene. This is particularly true of many of the so-called "underdeveloped" nations and areas of the world. Therefore, some means (other than by use of dentifrices) must be employed if exposure of the populace to fluorides in amount (and in the form) which can effectively control dental caries is to be achieved. One way which is known to be effective where distribution system for water exists is to dissolve a small amount of a fluoride in the water. However, a large segment of the world population is not served by a water distribution system of the type in which such a method can be used effectively.

Actually, since almost everyone utilizes certain well-known materials in their diet, such as salt (sodium chloride), one potentially very effective way of introducing fluorides into the living bodies of that segment of the world population which cannot ordinarily be "reached" with fluoride-containing dentifrices and/or fluoride-treated drinking water is by intermixing a small amount of one of the effective fluoride compounds with the salt, or with sugar, or a similar material which is subsequently consumed by the people with their usual diets. (In order to avoid confusion, the word "salt" will be used herein to mean ordinary table salt—sodium chloride—unless otherwise stated.) Simple intermixing of the ingredients (for example, NaCl plus a very small amount of an effective fluoride compound), however, has been found to be a somewhat ineffective way to introduce the fluoride to humans, because mechanical mixtures of NaCl with almost any of the effective fluoride compounds segregate or separate when they are handled, shipped, etc. so that it is normally practically impossible to maintain a simple mechanical admixture (of table salt with sodium fluoride for example) in an acceptably homogeneous state for an extended period of time. Because of the relatively high toxicity of large doses of most of the fluoride compounds that are effective anti-caries materials, separation of such materials from the table salt in a container can also be extremely dangerous, because while some consumers of such a segregated composition might ingest practically pure sodium chloride (from a portion of the material in the containers that has "lost" its fluoride compound), others may be exposed to dangerously large doses of the fluoride compound. Thus, the need for a method for preventing the separation of one of the effective (anti-caries) fluoride compounds from an approximately homogeneous admixture of the fluoride compound with ordinary table salt can readily be appreciated.

Consequently, it is an object of the present invention to provide processes whereby a fluoride compound which is effective for the prevention of dental caries can be intermixed with ordinary table salt so that it cannot readily be segregated therefrom during ordinary handling, shipping and storage.

It is another object of the present invention to provide novel compositions which, when ingested by humans, can function effectively in reducing the incidence of tooth decay.

It is still another object of this invention to provide novel processes for manufacturing a novel fluoride-containing composition, which composition is difficulty segregatable from an admixture of said composition with ordinary table salt.

These objects, as well as others which will become apparent from the following discussion, can be attained by practicing the present invention. The present invention essentially involves the manufacture of novel, specially-prepared "conditioning" compositions, the utilization of these specially-prepared "conditioning" compositions in the preparation of edible compositions containing a large proportion of salt, for example, and the novel, unexpectedly advantageous, conditioned salt compositions that result therefrom. The novel conditioning agents of this invention are those that can be manufactured by contacting a hot layer or bed of a salt conditioning agent with an aqueous solution containing a water-soluble fluoride compound, and quickly removing the water, moiety of the aqueous solution from the hot layer or bed (i.e. by flash-drying) before substantially all of the fluoride compound has reacted with the conditioning agent.

It is an advantage of the present invention that practically any conditioning agent which is useful as an anti-caking or flow-conditioning agent can be utilized in its practice. It is well known that a useful anti-caking and/or flow-conditioning agent for a crystalline, particulated material such as salt, sugar, and spices is one which can readily be intermixed with the materials to be conditioned, which conditioning agent when intermixed with the materials, effectively coats the individual particles of the material to be conditioned so that the conditioned particles flow freely over one another, often under conditions of high temperatures and high relative humidity. The conditioning agent also usually prevents the particles of conditioned material from sticking together and thereby becoming "caked." Typical examples of such useful conditioning agents (including the well-known anti-caking and/or flow-conditioning agents) which, in order to be effective as anti-caking or flow-conditioning agents must be in a very finely-divided state (generally, almost all of the particles can pass through a 30 mesh U.S. Standard, screen) when they are intermixed with salt, for example, are the substantially water-insoluble phosphates; such as tricalcium orthophosphate, calcium pyrophosphate, calcium tripolyphosphate, calcium disodium pyrophosphate and magnesium disodium pyrophosphate and mixtures thereof; as well as the alumina silicates such as sodium calcium aluminum silicate, potassium calcium aluminum silicate, and sodium magnesium aluminum silicate; calcium silicate hydrate; magnesium carbonate; calcium carbonate; silica aerogels; calcium sulfate; and even the common clays.

It is another advantage of this invention that any of the water-soluble fluoride salts that can be used for the prevention of dental caries can be utilized in the practice of the invention. This includes practically every fluoride salt that ionizes in water to form free fluoride ions in an amount equal to at least about 0.2 weight percent, based on the total weight of said solution, of fluoride ions. Typical examples of such useful fluoride salts include the alkali metal fluorides such as sodium, potassium and lithium fluoride, stannous fluoride, cupric fluoride, ammonium fluoride, iron fluoride, ammonium fluosilicate, sodium fluosilicate, potassium fluosilicate, as well as mixed halide salts such as the chlorofluorides, e.g. SnClF, and other materials containing available fluoride.

The preparation of the novel conditioning compositions of the present invention is accomplished via a process which comprises the step of flash-drying or quick-drying an aqueous solution of the fluoride compound from a hot bed or layer of one of the conventional conditioning agents such as those described above. The flash-drying is preferably accomplished by spraying or squirting (e.g. in the form of a stream or droplets) the aqueous solution (containing a fluoride compound dissolved therein) onto a layer or bed of the particular conditioning agent being utilized while the bed is maintained at a temperature sufficiently high to cause the water portion or moiety of the fluoride-containing aqueous solution to evaporate from the layer or bed before the fluoride salt has had sufficient time to react with the conditioning agent, and thereby become substantially entirely insoluble in water.

The actual maximum amount of time that the fluoride compound can be maintained in contact with the conditioning agent (in the dissolved state) before the fluoride compound has substantially completely reacted with the conditioning agent has been found to vary considerably, depending upon such factors as the temperature of the bed of conditioning agent onto or into which the aqueous solution is placed, the particular conditioning agent and fluoride compound utilized, the concentration of the fluoride compound in the aqueous solution, and on other factors which in view of the present disclosure, can readily be appreciated by those skilled in the art. Generally, however, the water should be substantially completely evaporated from the bed or layer within about 10 minutes of the time the fluoride-containing aqueous solution is introduced into or onto the bed or layer of conditioning agent, and particularly when phosphate salts are utilized as the conditioning agent. When such phosphate salts are used, the water should generally be evaporated substantially completely from the bed or layer within about 5 minutes, but preferably within about 2 minutes. When the layer or bed contains a large proportion of orthophosphate salts such as tricalcium orthophosphate (hydroxylapatite), it is preferred that the flash-drying (quick removal of water from the bed or layer) occur as quickly as possible (e.g. in about 45 seconds, or even less).

For best results in the practice of the invention, the temperature of the layer or bed of conditioning agent should be between about 120° C. and about 600° C., although generally it is preferred that the temperature of the bed be at least about 150° C. when the aqueous solution of the fluoride compound is added thereto. It is also preferred that the rate of addition of the aqueous fluoride solution to the hot bed be adjusted and maintained so that the average temperature of the layer or bed will remain above about 100° C. during this flash-drying step. Heat can also be applied to the layer or bed while the water is being evaporated therefrom, although it is preferred that the conditions be such that the evaporation of the water be largely accomplished while the aqueous solution is in physical contact with the particles of conditioning agent that make up the layer or bed (as compared with evaporating a large fraction such as more than half of the water while the aqueous solution is passing through the air immediately above or around the hot bed or layer of conditioning agent, but before it is actually in physical contact with the bed). This is to insure the crystallization of substantially all of the water-soluble fluoride salt from the aqueous solution on the surfaces of the conditioning agent, i.e. while the aqueous solution is intimately intermingled with the particles of conditioning agent. While the reason that superior result sare obtained when the greater proportion of the water (in the aqueous fluoride solutions that are utilized in the practice of this invention) be evaporated only after the solution has initially physically contacted the layer or bed of conditioning agent is not known definitely, it is believed that, since the special conditioning products made according to the processes described herein cannot ordinarily be separated into their fluoride salt and conditioning agent moieties to any great extent (while almost invariably, simple mechanical admixtures of the fluoride salts and conditioning agents, no matter how finely ground are the individual components, tend to separate or stratify readily), the crystals of soluble fluoride salts are present on the surfaces of the individual particles of special fluoride salt-conditioning agent compositions of this invention, and somehow physically bound thereto, in an extremely finely-divided state, being actually to a significant extent even partly inside the "pores" or channels in the individual porous particles of conditioning agent, so that it is literally impossible to mechanically separate most of the fluoride crystals therefrom.

The concentration of fluoride compounds that are present in the aqueous solutions that are utilized in the processes of this invention will depend to some extent upon the actual solubility of the fluoride compound in water. Generally, it is preferred that there be dissolved in the aqueous solution from about 0.01 weight percent up to about the maximum solubility limit of the particular fluoride salt being utilized in the water, although the invention can nevertheless be practiced to advantage even if slurries of the effective fluoride compounds in the water are utilized. When such a slurry is used, and as a matter of fact, at all times in the practice of this invention, it is preferred that the water moiety of the aqueous solution (or slurry) be equal to at least about 50 weight percent of the total weight of solution (or slurry) that is sprayed, squirted, or poured onto the hot bed of conditioning agent described above.

The actual amount or proportion of fluoride compound that is added to the conditioning agent in the manner described above can vary considerably, depending upon the particular conditioner that is used, the amount of the conditioner composition that must be intermixed with the crystalline material that is to be conditioned thereby, the amount or level of fluoride compound desired in the final specially conditioned compositions, etc. As a general rule, however, the conditioning agent can be utilized from about 0.1 weight percent to about 10 weight percent of the total weight of the specially conditioned compositions and preferably at from about 1 to about 5 weight percent. The level of fluoride, calculated as F in the specially conditioned compositions can also vary considerably, depending practically solely upon the desired level of fluoride to be consumed by those who are to ingest these compositions. Generally, the desired fluoride level can range from about 0.002 to about 0.5 weight percent of the total weight of the conditioned compositions, although a preferred range is from about 0.005 to about 0.1 weight percent of fluorine (F). Hence, the amount of fluoride compound that must be added to the conditioning agent according to the processes of this invention should generally be from about 0.01 weight percent (based on the fluoride ion content of the fluoride compound) of the total combined weight of the conditioning agent plus fluoride compound to about 20 weight percent, which level represents the level, above which the conditioning agent loses a substantial amount of its ability to condition (cling to) the salt crystals. Preferable conditioning agents prepared according to the processes of this invention, however, contain from about 0.05 to about 5 weight percent of F.

In the following examples, which are merely illustrative of some of the preferred embodiments of the present invention, all parts are by weight unless otherwise specified.

EXAMPLE I

*Preparing the fluoride-conditioner composition*

Onto a bed consisting of 1000 parts of finely-divided calcium pyrophosphate, which is being tumbled in a conventional, stainless steel, externally heated rotary calciner and maintained at a temperature of about 250° C. is slowly sprayed (over a period of about 10 minutes) 250 parts of a 4 weight percent aqueous solution of sodium fluoride. During the addition of the aqueous sodium fluoride solution, the average temperature of the bed of calcium pyrophosphate is maintained above about 150° C. by the addition of heat through the walls of the calciner. Thus, any given part of the aqueous solution remains in physical contact with the agitated bed, on the average, less than about 30 seconds.

After all of the fluoride solution is flash-dried from the bed, the fluoride-pyrophosphate composition is discharged from the calciner and cooled. It is practically identical in physical appearance to the calcium pyrophosphate starting material. However, by analysis, it is found to contain approximately 1 weight percent of sodium fluoride, over half of which is present in a water-soluble form. The water-soluble fraction is determined by preparing a 50 weight percent slurry of the fluoride-pyrophosphate composition in water, stirring the slurry for about 30 minutes, then allowing the insoluble fraction of the slurry to settle and analyzing the aqueous layer for soluble fluoride.

EXAMPLE II

*Conditioning salt*

In a conventional ribbon-type mixer, 10,000 parts of ordinary unconditioned table salt and 200 parts of a fluoride-pyrophosphate composition prepared as in Example I, above, are blended for about 10 minutes. The resulting conditioned salt has excellent flow properties, is substantially more resistant to caking than ordinary unconditioned salt when it is subjected to a highly humid atmosphere, and contains about 0.02 weight percent of sodium fluoride, over half of which is readily soluble in water. The soluble fraction of the fluoride is thus readily available to immediately react with the teeth of those who take any of this specially conditioned salt into their mouths. At least part of the water-insoluble fraction of the fluoride can also subsequently be made available to the bodies of those who ingest the specially conditioned salt compositions of this invention when the insoluble fluoride compounds are solubilized in their digestive tracts. An additional advantage of the fluoridated calcium phosphate conditioners of this invention is that both calcium and phosphorus are also available from the conditioners as food supplements to help build stronger, healthier teeth for those who consume them. Thus, calcium phosphate conditioning agents that have been specially fluoridated according to the processes of this invention are particularly preferred embodiments of the present invention. The fluoridated containing agents of this invention can also serve as absorbing agents for other health supplements such as vitamins, other minerals, and the like, the extremely high surface area of the fluoridated conditioning agents making it possible to absorb or adsorb a relatively high level of such beneficial materials, so that they, too, can be ingested along with the salt in the diet, as described above.

The basic procedures illustrated in the foregoing examples can be utilized with any of the flow conditioning agents described above, as well as any of the soluble fluoride salts.

What is claimed is:

1. A process which comprises bringing an aqueous solution containing dissolved fluoride ions into intimate physical contact with a hot bed, at least a major proportion of said bed being a particulated flow-conditioning agent, said bed being maintained during said contact at a temperature sufficiently high to cause the evaporation from said bed of the aqueous moiety of said solution before substantially all of said fluoride ions have reacted with said agent.

2. A process which comprises preparing a hot bed by heating a particulated flow-conditioning agent to a temperature above about 120° C. and thereafter contacting said hot bed with an aqueous solution containing dissolved fluoride ions and heating said hot bed at a rate sufficient to maintain the average temperature of said bed during said contacting above about 120° C.

3. A process as in claim 2, wherein the total amount of said aqueous solution is sufficient to supply to said hot bed between about 0.01 and about 20 weight percent based on the weight of said hot bed, of said fluoride ions.

4. A process which comprises preparing a hot bed by heating a particulated, substantially water-insoluble phosphate salt to a temperature between about 150° C. and about 600° C. and contacting said hot bed with an amount of an aqueous solution containing dissolved therein between about 0.01 and about 50 weight percent of a water-soluble fluoride salt which yields fluoride ions when it is dissolved in said aqueous solution, said amount being sufficient to supply to said hot bed between about 0.05 and about 5 weight percent, based on the weight of said bed, of fluoride ions; the average temperature of said hot bed during said contacting being above about 100° C.

5. A process which comprises evaporating from a hot zone containing a particulated calcium phosphate salt selected from the group consisting of tricalcium orthophosphate, calcium pyrophosphate, calcium tripolyphosphate, calcium disodium pyrophosphate, magnesium disodium pyrophosphate, and mixtures thereof at a temperature between about 150° C. and about 600° C., the water moiety of an aqueous solution containing dissolved therein at least about 0.01 weight percent of an alkali metal fluoride salt, said evaporating being accomplished while the average temperature of said phosphate salt is maintained above about 100° C. and said aqueous solution being brought into physical contact with said phosphate salt after the temperature of said phosphate salt is at least about 150° C.

6. A process as in claim 5, wherein said alkali metal fluoride salt is sodium fluoride.

7. A process which comprises preparing a hot bed by heating particulated calcium pyrophosphate to a temerature between about 150° C. and about 600° C., and thereafter spraying onto said bed, while said bed is being agitated and maintained at an average temperature above about 100° C., an aqueous solution containing up to about 10 weight percent of sodium fluoride, the amount of said aqueous solution being sufficient to supply to said bed between about 0.05 and about 5 weight percent based on the weight of said bed of fluorine.

8. A particulated flow-conditioning composition containing dispersed over the surfaces of the particles of said composition an amount of an inorganic fluoride salt, said amount being sufficient to supply from about 0.01 to about 20 weight percent, based on the weight of said composition, of fluorine.

9. A flow conditioning agent comprising finely-divided substantially water-insoluble phosphate salt containing an amount of an inorganic fluoride salt sufficient to supply from about 0.05 to about 5 weight percent, based on the weight of said agent, of fluorine, said fluoride salt being physically bound to said phosphate salt whereby said agent remains substantially homogeneous when subjected to normal handling, storage, and use.

10. A flow-conditioning agent compirsing a finely-divided, water insoluble calcium phosphate salt having dispersed over the surfaces of the phosphate salt particles, from about 0.05 to about 5 weight percent of sodium fluoride, said sodium fluoride being physically bound to said calcium phosphate salt.

11. A table salt composition comprising sodium chloride crystals conditioned with a flow-conditioning agent comprising a finely-divided, substantially water-insoluble compound having dispersed over the surfaces of the particles of said agent and physically bound thereto an amount of an inorganic fluoride salt sufficient to supply from about 0.002 to about 0.5 weight percent, based on the total weight of said composition, of fluorine.

12. A flow-conditioned salt composition comprising up to about 99.9 weight percent of particulated sodium chloride and from about 0.1 to about 10 weight percent, based on the weight of said sodium chloride, of finely-divided particles of a water insoluble calcium phosphate salt intimately admixed with said sodium chloride, said calcium phosphate salt having dispersed over the surfaces of said particles and physically bound thereto an amount of a water-soluble fluoride salt which yields fluoride ions when it is dissolved in water sufficient to supply to said composition from about 0.005 to about 0.1 weight percent, based on the total weight of said composition, of fluorine.

13. A flow-conditioned salt composition as in claim 12 wherein said phosphate salt is calcium pyrophosphate and said fluoride salt is sodium fluoride.

14. A flow-conditioned salt composition as in claim 12, wherein said phosphate salt is tricalcium orthophosphate.

15. A method for preparing a fluoridated. flow-conditioned table salt which comprises wetting the surfaces of a particulated flow conditioner with an aqueous solution of a water soluble fluoride salt, drying the thus treated flow conditioner, and thereafter adding the dried, fluoride-containing flow conditioner to crystalline sodium chloride in an amount sufficient to provide a composition containing from about 0.002 to 0.5% by weight of fluorine.

References Cited by the Examiner

UNITED STATES PATENTS

| | | | |
|---|---|---|---|
| 690,126 | 12/1901 | Weddell | 23—108 X |
| 1,194,344 | 8/1916 | Huber et al. | 23—88 X |
| 1,865,733 | 7/1932 | Warning et al. | 99—143 |
| 2,697,024 | 12/1954 | Moss et al. | 23—109 |
| 2,749,278 | 6/1956 | Moss | 167—93 |
| 2,768,095 | 10/1956 | Tadema et al. | 117—100 |
| 2,876,166 | 3/1959 | Nebergall | 167—93 |
| 2,876,168 | 3/1959 | Broge et al. | 167—93 |
| 2,901,400 | 8/1959 | Thomas | 167—93 |
| 2,922,697 | 1/1960 | Bell et al. | 23—89 |
| 2,943,982 | 7/1960 | Dahlin | 167—93 |
| 2,967,131 | 1/1961 | Elbreder et al. | 167—93 |
| 2,995,773 | 8/1961 | Gidlow et al. | 81—1 |
| 3,027,304 | 3/1962 | Robertson | 167—93 |
| 3,063,801 | 11/1962 | Groves | 23—107 |

OTHER REFERENCES

Irani et al.: "How to Select Flow Conditioning and Anticaking Agents," Ind. Eng. Chem. 51 (10): 1285–1288, October 1959.

Irani et al.: "Water Vapor Sorption in Flow Conditioning and Cake Inhibition," Ind. Eng. Chem. 53 (2): 141–142, February 1961.

LEWIS GOTTS, *Primary Examiner*.

FRANK CACCIAPAGHA, S. K. ROSE, *Examiners*.